United States Patent [19]
Cryder et al.

[11] 3,856,041
[45] Dec. 24, 1974

[54] COMBINATION RELIEF AND MAKE-UP VALVE

[75] Inventors: John R. Cryder; Edward A. Wirtz, both of Joliet, Ill.

[73] Assignee: Caterpillar Tractor Co., Peoria, Ill.

[22] Filed: Nov. 28, 1973

[21] Appl. No.: 419,625

[52] U.S. Cl............ 137/493.6, 137/512.2, 137/115, 91/436
[51] Int. Cl............................................. F16k 17/26
[58] Field of Search ..... 137/110, 115, 512.2, 493.1, 137/493.3, 493.4, 493.5, 493.6; 251/29; 91/436

[56] References Cited
UNITED STATES PATENTS

| | | | |
|---|---|---|---|
| 2,367,682 | 1/1945 | Kehle | 91/436 |
| 2,665,708 | 1/1954 | Ghormley | 137/493 |
| 2,758,811 | 8/1956 | Peterson | 251/29 |
| 3,112,763 | 12/1963 | Tennis et al. | 137/493.5 |
| 3,129,720 | 4/1964 | Allen et al. | 91/436 X |
| 3,749,121 | 7/1973 | Frankewich | 137/512.2 |

*Primary Examiner*—William R. Cline
*Attorney, Agent, or Firm*—Phillips, Moore, Weissenberger Lempio & Strabala

[57] ABSTRACT

There is disclosed a valve assembly comprising an integral relief and make-up valve provided for use in hydraulic systems. The compact assembly comprises a reciprocal valve spool disposed between a fluid supply conduit and a fluid discharge conduit and relief valve means contained within the valve spool for relieving fluid pressure within the fluid supply conduit. The valve spool is responsive to pressure differentials within the system, permitting increased fluid flow from a fluid discharge conduit to the fluid supply conduit as required.

6 Claims, 3 Drawing Figures

COMBINATION RELIEF AND MAKE-UP VALVE

BACKGROUND OF THE INVENTION

This invention relates to a valve assembly for a hydraulic system. In particular, this invention relates to an integral relief and make-up valve assembly for use in hydraulic systems of the type wherein a hydraulic cylinder is selectively actuated by fluid pressure directed from pump means to either end of the cylinder, causing the cylinder rod to extend or retract.

Conventional hydraulic systems which utilize cylinders for operating implements or the like, frequently employ relief and make-up valves which are either separate components or combined in a single valve body. Typically, the prior art valve assemblies comprising combined relief and make-up valves are complex in design and require a fairly large housing to contain the numerous components associated therewith. Additionally, many such valves are not directly responsive to pressure conditions within the hydraulic system, but must be actuated by a pilot valve.

Examplary of such prior art valve assemblies are those described in U.S. Pat. Nos. 2,986,166; 3,134,402; 3,529,624; 2,665,708; 3,164,166; 3,100,503; 2,758,811 and 3,112,763.

SUMMARY AND OBJECTIVES OF THE INVENTION

The invention comprises an integral relief and make-up valve assembly having relief valve means disposed within a make-up valve comprising a reciprocable valve spool disposed between a fluid supply line and a fluid discharge line within the hydraulic system. The make-up valve is responsive to low fluid pressure in the supply line, reciprocating to permit fluid flow between the supply and discharge lines when conditions require, thereby increasing fluid flow to the cylinder. The relief valve means are responsive to predetermind excessive pressures in the fluid supply line opening to permit fluid flow between the supply and discharge lines when conditions require, thereby relieving fluid pressures in the supply line.

It is therefore an object of this invention to provide an integral make-up and relief valve assembly for hydraulic systems which is simple and compact.

It is another object of this invention to provide an integral make-up and relief valve assembly for hydraulic systems which is automatically responsive to pressure differentials within the system.

DETAILED DESCRIPTION OF THE DRAWINGS

Figure 1:
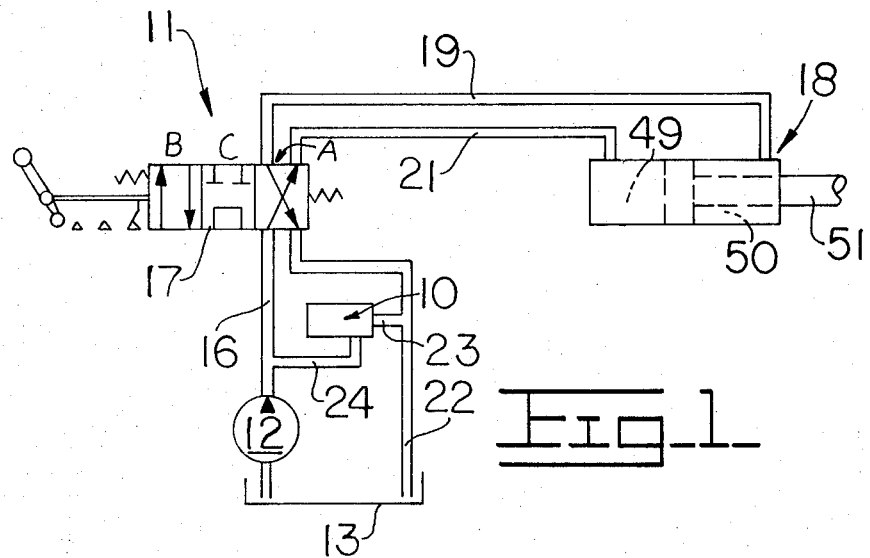
FIG. 1 is a schematic illustration of a hydraulic system incorporating the integral make-up and relief valve assembly of this invention.

With particular reference to FIG. 1, an integral relief and make-up valve assembly 10 is shown incorporated in a hydraulic circuit indicated generally at 11, such as a hydraulic implement circuit of an earth-moving vehicle. The circuit 11 includes a pump 12 for supplying fluid through a fluid supply conduit 16 to a directional control valve 17. The control valve 17 conventionally comprises a three-position four-way valve permitting an operator to selectively communicate pressurized fluid to either end of a hydraulic jack or cylinder 18 via conduits 19 or 21, and the fluid in the opposite end of the cylinder to the tank 13 via a fluid discharge conduit 22. The valve assembly 10 is disposed between a conduit 23, a branch of fluid discharge conduit 22, and a conduit 24, a branch of fluid supply conduit 16, in a normally blocking relationship.

Figure 2:
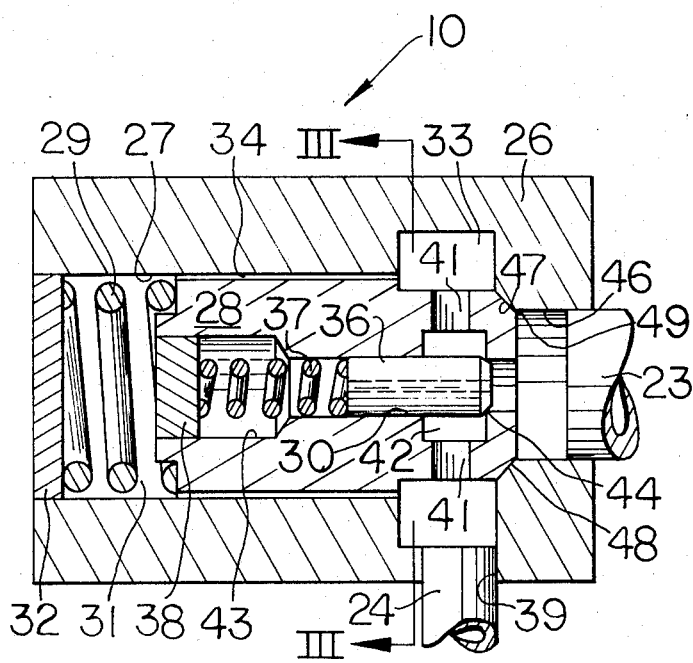
FIG. 2 is a longitudinal cross-sectional view of the valve assembly of this invention.
Figure 3:
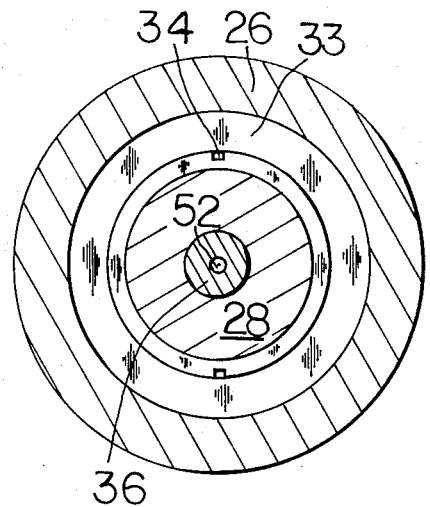
FIG. 3 is a cross-sectional view of the valve assembly of this invention taken generally along line III—III of FIG. 2.

With particular reference to FIG. 2, valve assembly 10 is shown having a valve assembly housing 26 with a longitudinal bore 27 forward therein accommodating a reciprocable valve spool or plunger, hereinafter referred to as a spool 28 spring-biased against the forward end of the housing 26 by a spring 29 disposed within a chamber 31 between the rearward end of the valve spool 28 and a housing cover 32 rigidly affixed to the housing 26. The housing 26 is further provided with an annulus 33 in the forward end thereof, surrounding and communicating with the housing bore 27 and with the chamber 31 as by passages or grooves 34 axially disposed in the periphery of the spool 28.

The assembly 10 further includes a relief valve means comprising a poppet valve 36 coaxially disposed within an intermediate bore 30 for regulating fluid flow between the fluid supply conduit 24 and the fluid discharge conduit 23. The poppet valve 36 is spring-biased against the forward end of the valve spool 28 by a poppet spring 37 disposed between the rearward portion of the poppet valve and a cover 38 rigidly affixed to the rearward portion of the spool 28.

Pressurized fluid from fluid supply conduit 24 enters or communicates wtih the interior of the housing 26 in the side or bottom thereof, as viewed in FIG. 2, communicating between the first annulus 33 and the supply portion of the conduit 24. Fluid pressure in the supply conduit 24 and the first annulus 33 are communicable to the poppet valve 36 as by a plurality of bores 41 communicating between the first annulus 33 and a second annulus 42 disposed in the spool 28 within a stepped bore 43 so that the bore 43 and the annulus 42 form a poppet valve seat 44 so that the poppet valve 36 is urged against the valve seat by poppet spring 37 to bias the poppet valve closed.

Fluid from the fluid discharge circuit 23 enters the housing 26 through a discharge port 46 in the forward end of the housing 26. A conical surface 47 in the housing 26 adjacent to the annulus 33 and the discharge port 46 conforming to a conical surface 48 on the spool 28 provides a valve spool seat 49 against which the valve spool 28 is urged by the spool spring 29 when the valve spool is in closed position.

The hydraulic cylinder 18 is of the usual double acting type having a head end 49 and a rod end 50, either one of which may be supplied pressurized fluid. A rod 51 is connected to a piston and a load (not shown).

The valve assembly operates as follows:

With the control valve 17 in the position shown as "A," pressurized fluid is directed from the pump 12 to the head end 49 of the cylinder 18, causing the cylinder rod 51 to extend. The fluid in the rod end 50 of the cylinder 18 is expelled to the tank 13 via conduits 19 and 22. The pressurized fluid in the supply conduit 24 enters the housing 26 of the valve assembly 10 at the port 39. The pressurized fluid then encircles the spool 28 via the annulus 33, and is communicated to the annulus 42 via the bores 41, acting against the differential area of the conical poppet valve surface which abuts the poppet valve seat 44. Pump pressure in excess of a predetermined value will cause the poppet valve 36 to unseat and permit fluid flow between conduits 24 and 23, dumping excess fluid into the discharge conduit 22 and thence into the tank 13.

The make-up valve spool 28 is directly exposed to return line pressure in the port 44 and head-end cylinder line pressure in the annulus 33. Pressurized fluid from the annulus 33 enters the chamber 31 via the grooves 34, thereby retaining spool 28 against the valve spool seat 49 when pressure in the cylinder conduit is sufficiently high. During the operation of extending the cylinder rod 51, as described above, the volume of fluid expelled from the rod end 50 of the cylinder 18 is proportionally less than the fluid required to fill the head end 49 of the cylinder 18. The force created by the weight of the implement attached to the rod (not shown) has a tendency to cause the rod to extend faster than the pump can supply fluid to the head end 49 of the cylinder 18, creating a lower pressure area in the fluid conduit 21 and a higher pressure in the discharge conduit 22. This pressure differential is translated to the spool 28. The lessening of pressure in the chamber 31 rearward of the spool 28, and the increased pressure in the discharge port 46 establishes an unbalanced condition. When the pressure differential is sufficiently high to overcome the force of the spool spring 29, the spool will shift rearwardly, permitting fluid to flow from discharge conduit 23 through housing 26 to supply conduit 24, thereby providing the additional fluid required. Preferably, poppet valve 36 is vented by an axial hole 52, so that increased pressure in the dischage conduit 23 does not unseat the poppet valve.

To retract the cylinder rod 51, the control valve 17 is shifted to position "B" which communicates pressurized fluid to the rod end 50 of the cylinder 18 via conduits 16 and 19, and discharge fluid from the head end 49 of the cylinder via conduits 21 and 22 to the tank 13. In this case, the poppet valve 36 would operate as described above, but the valve spool 28 would not be operative, as the fluid volume differential is reversed, and the implement load would tend to oppose retraction and thus cylinder motoring would not be the case.

In the neutral position C, pump flow is directed to the tank 13, and the conduits 19 and 21 are obstructed. However, in the event pump pressure rises due to malfunction, the poppet valve 36 would operate as described above.

In view of the foregoing, it is apparent that the valve assembly of the present invention provides an improved and compact means for regulating fluid pressure within a hydraulic system. While the invention has been described with particular reference to a preferred embodiment and shown in a particular circuit, it is apparent that vairations and modifications are possible within the purview of the invention. The valve can also be used in a wide range of circuits as well as in various positions within a particular circuit wherever the combination of make-up and relief is necessary. For example, a valve such as 10 may be appropriately placed in either one or both of motor lines 19 and 21 with the low pressure side thereof in communication with return line 22. It would thus serve as cylinder line make-up and relief. No limitation with respect to such variations and modifications is intended, except by the scope of the appended claims.

We claim:
1. A combination relief and make-up valve assembly comprising:
 a housing having a cylindrical bore formed therein;
 a low pressure port communicating with said bore at one end thereof;
 a first valve seat defined by the juncture of said port and said bore;
 an annulus surrounding said bore and communicating therewith adjacent said valve seat;
 a high pressure port communicating with said annulus;
 a first poppet plunger reciprocally disposed in said bore and biased into engagement with said valve seat;
 a stepped bore closed at one end formed in said first poppet plunger defining a second seat adjacent the open end thereof;
 an annulus surrounding and communicating with said bore at the intersection of said step of said bore;
 a second poppet plunger disposed in said bore and engaging said second valve seat;
 passage means communicating said annulus in said plunger with said annulus in said housing;
 said second poppet plunger including a bore communicating pressurized fluid in said low pressure port to the closed end of said bore;
 spring means in said closed end of said bore biasing said second plunger into seated engagement with said second valve seat; and
 said second plunger including an area in communication with said high pressure port and disposed to creat a force in response to said pressurized fluid in opposition to said spring means to thereby unseat said second plunger in response to a predetermined pressure.
2. The valve assembly of claim 1 comprising means communicating pressurized fluid from said high pressure port to the end of said first poppet plunger away from said valve seat.
3. The valve assembly of claim 2 wherein said communicating means comprises a plurality of grooves formed in the outer surface of the first plunger.
4. A combination relief and make-up valve assembly comprising:
 a housing having a cylindrical bore formed therein;
 a low pressure port of a cylindrical configuration disposed coaxial with said bore and communicating therewith;
 an annular valve seat defined by the juncture of said port and said bore;
 an annulus surrounding said bore and communicating therewith adjacent said valve seat;
 a high pressure port communicating with said annulus;
 a first poppet plunger reciprocally disposed in said bore and biased into engagement with said valve seat;
 a stepped bore closed at one end formed in said first poppet plunger defining an annular seat adjacent the open end thereof;

an annulus surrounding and communicating with said bore at the intersection of said step of said bore;

a second poppet plunger disposed in said bore and engaging said valve seat;

passage means communicating said annulus in said plunger with said annulus in said housing;

said second poppet plunger including a bore communicating pressurized fluid in said low pressure port to the closed end of said bore;

spring means in said closed end of said bore biasing said plunger into seated engagement with said seat; and, said second plunger including an area communicating with said high pressure port and disposed to create a net force in response to said fluid in opposition to said spring means.

5. The valve assembly of claim 4 comprising means communicating pressurized fluid from said high pressure port to the end of said first poppet plunger away from said valve seat.

6. The valve assembly of claim 5 wherein said communicating means comprises a plurality of grooves formed in the outer surface of the first plunger.

* * * * *